United States Patent [19]

Warren et al.

[11] Patent Number: 5,310,796

[45] Date of Patent: May 10, 1994

[54] ADHESIVE WITH POLYESTERURETHANE, HALOGENATED POLYOLEFIN AND DIELS-ALDER ADDUCT

[75] Inventors: Patrick A. Warren; William S. Pfister; Mark A. Weih, all of Erie, Pa.

[73] Assignee: Lord Corporation, Erie, Pa.

[21] Appl. No.: 36,122

[22] Filed: Mar. 23, 1993

[51] Int. Cl.$^5$ .................. C08L 9/00; C08L 23/28; C08L 53/02; C08L 75/06

[52] U.S. Cl. .................. 525/92; 525/93; 525/111; 525/129

[58] Field of Search .............. 525/92, 93, 111, 129

[56] References Cited

U.S. PATENT DOCUMENTS

| | | | |
|---|---|---|---|
| 3,362,843 | 1/1968 | Smith et al. | 117/72 |
| 3,666,539 | 5/1972 | Kiel | 117/124 |
| 3,734,763 | 5/1973 | Plueddemann | 117/72 |
| 3,991,011 | 11/1976 | Marciniak et al. | 521/98 |
| 3,998,985 | 12/1976 | Kitaj | 427/386 |
| 4,162,276 | 7/1979 | Rim et al. | 524/116 |
| 4,595,718 | 6/1986 | Allen et al. | 523/434 |
| 5,051,474 | 9/1991 | Warren et al. | 525/131 |
| 5,102,937 | 4/1992 | Warren et al. | 524/261 |
| 5,175,215 | 12/1992 | Weih | 525/292 |
| 5,185,402 | 2/1993 | Fleming et al. | 528/75 |

*Primary Examiner*—Robert E. Sellers
*Attorney, Agent, or Firm*—W. Graham Buie

[57] ABSTRACT

An adhesive composition containing a linear polyester polyurethane, a halogenated polyolefin, an epoxy/silane adduct, a Diels-Alder adduct of a halogenated cyclic conjugated diene and a block copolymer of styrene and butadiene and a crosslinking compound for the linear polyester polyurethane. The adhesive composition is preferably utilized as a two-component adhesive for bonding vinyl polymers such as polyvinyl chloride to various substrates such as glass. The adhesive composition exhibits substantial resistance to environmental conditions without the requirements of a pre-heating step.

17 Claims, No Drawings

ADHESIVE WITH POLYESTERURETHANE, HALOGENATED POLYOLEFIN AND DIELS-ALDER ADDUCT

FIELD OF THE INVENTION

This invention relates to the bonding of glass to elastomeric materials. More specifically, the present invention is an improved adhesive composition which is capable of providing high strength and environmentally resistant bonds between certain elastomeric compositions such as vinyl chloride polymers and a glass substrate.

BACKGROUND OF THE INVENTION

The bonding of elastomeric materials such as polyvinyl chloride to a glass substrate is well known and is utilized in many industries involving devices which require the interface of an elastomeric material and glass parts or components. The vinyl chloride polymer, or other elastomer, is typically injection molded or applied as a hot melt to a glass substrate that has been coated with an appropriate adhesive. In many applications, in order to obtain an effective bond between the elastomer and glass surface, preheating of the adhesive after application to the glass surface is required.

One application, which is gaining popularity and represents a new concept in automotive design, is the production of modular windows. Modular windows can significantly reduce the drag coefficient of an automobile which employs such a window. Modular windows are prepared by a one-step molding process wherein the edge of a glass component is bonded within a polymeric gasket. The polymeric gasket is typically made of a material such as reaction injection molded (RIM) urethane or polyvinyl chloride.

One example of an effort to improve the adhesion of vinyl polymers to glass surfaces is disclosed in U.S. Pat. No. 3,998,985, which relates to the incorporation of certain polyaminosilane compounds within the vinyl polymer to be bonded. Specifically, the vinyl polymer is mixed with a combination of a polyaminosilane and a primer which contains an epichlorohydrin-Bisphenol A resin, N-aminoethyl-gamma-aminopropyltrimethoxy silane, ethyleneglycolmonomethyl ether, and ethyleneglycolmonoethylether acetate.

Further examples of vinyl polymer-glass adhesives are disclosed in U.S. Pat. No. 3,666,539, which discloses epoxy reactive silanes which act as coupling agents for adhering various polymers to glass; U.S. Pat. No. 3,362,843, which discloses a mixture of an aminoalkylalkoxy silane and an epoxy resin-methyl methacrylate primer; and U.S. Pat. No. 3,734,763, which discloses the use of N-[beta-(N'-paravinylbenzyl)-aminoethyl]gamma-aminopropyltrimethoxy silane hydrochloride as a vinyl polymer-glass coupling agent.

Although previously developed vinyl polymer-glass adhesives such as those disclosed above work reasonably well in certain applications, it would be desirable to develop a vinyl polymer-glass adhesive which would be particularly adaptable to applications involving the production of modular windows. Such an adhesive should be capable of providing a weather-resistant bond without the requirement of preheating the adhesive-coated glass surface prior to bonding of the elastomeric material.

SUMMARY OF THE INVENTION

The present invention is a vinyl polymer-glass adhesive that has been shown to provide excellent environmental resistance without the requirement of a preheating step. The present adhesive composition provides vinyl polymer-glass adhesive bonds that will withstand extended exposure to water and/or high temperatures. Preheating of the adhesive of the present invention is not required in order to achieve adhesion between the elastomeric substrate and the glass surface. Specifically, the adhesive composition of the present invention comprises a linear polyester polyurethane, a halogenated polyolefin, an epoxy/silane adduct, a Diels-Alder adduct and a cross-linking compound.

The adhesive composition is preferably utilized in the form of two separate components which are mixed together prior to bonding. The first component of the present invention comprises the linear polyester polyurethane, the halogenated polyolefin, the epoxy/silane adduct, and the Diels-Alder adduct. The second component of the invention comprises the cross-linking compound for cross-linking the first component of the adhesive. The two components are preferably stored separately, and prior to application to a substrate, the components are thoroughly mixed together. After coating the substrate, the vinyl polymer is typically applied to the coated substrate in the form of a molten material, such as is carried out in a typical injection molding process. Vinyl polymer-glass bonds prepared in this manner with the adhesive of the present invention exhibit excellent primary adhesion between the bonded surfaces and demonstrate unusually high water resistance. Vinyl polymer-glass bonds prepared in accordance with the invention also perform well in high temperature environments.

DETAILED DESCRIPTION OF THE INVENTION

The adhesive composition of the present invention contains two components which can be applied between a vinyl polymer and a glass substrate under bonding conditions in order to produce an exceptionally high strength, water- and heat-resistant adhesive bond.

The first component of the present invention comprises a linear polyester polyurethane, a halogenated polyolefin, an epoxy/silane adduct and a Diels-Alder adduct. The linear polyester polyurethanes which are an essential element of the invention are typically prepared by reacting isocyanate-functional urethane polyester prepolymers with low molecular weight chain extending diols employing conventional techniques well known in the art. An extensive description of some of the useful techniques for preparing polyester urethane prepolymers can be found in Saunders and Frisch: "Polyurethanes, Chemistry and Technology," Part II, Interscience, (New York 1964), especially at pages 8 to 49, and in the references cited therein. Other preparative techniques which are known in the art can also be employed.

More specifically, the linear polyester polyurethanes which can be employed in the adhesive compositions of the present invention typically are prepared by reacting at least one linear polyester having two active hydrogen atoms with a diisocyanate in order to form an isocyanate-functional urethane polyester prepolymer. The urethane polyester prepolymer is then reacted with a low molecular weight chain extending diol in order to prepare the linear polyester polyurethane useful in the present invention.

The hydrogen atom-containing linear polyesters used to produce the polyurethanes of the invention are generally hydroxy-terminated polyesters having an average molecular weight in the range from about 500 to 4000. The linear polyesters are typically formed from bifunctional monomers having either aliphatic or aromatic segments therein. For example, the linear polyesters may be formed by reacting dihydric alcohols with polycarboxylic acids in hydroxyl:carboxyl ratios ranging from 2:1 to 15:14. Exemplary linear polyesters useful for forming the polyurethanes of the invention include condensation products of succinic acid, adipic acid, suberic acid, azelaic acid, sebacic acid, phthalic acid, isophthalic acid or terephthalic acid acid with difunctional hydroxy compounds such as ethylene glycol, diethylene glycol, 1,4-butane diol, 1,3-propane diol, 1,6-hexane diol, poly(ethylene oxide) diol, poly(ethylene oxide/propylene oxide) diol and poly(tetramethylene oxide) diol in various combinations well known in the art. Presently preferred active hydrogen-containing linear polyesters include 1,6-hexane diol phthalate polyester diol, 1,6-hexane diol adipate diol, and 1,6-hexane diol ethylene glycol adipate diol. Lactone-based polyester polyols, prepared according to methods known in the art by reacting a lactone such as caprolactone with a difunctional hydroxy compound as defined immediately above, may also be utilized in the present invention.

Any of the diisocyanates having two reactive isocyanate groups can be reacted with the linear polyester in order to create the isocyanate-functional urethane polyester prepolymers suitable for use in the practice of the invention. Such diisocyanates include, without limitation, diisocyanates such as 1,6-hexamethylene diisocyanate; 1,8-octomethylene diisocyanate; 1,12-dodecamethylene diisocyanate; 2,2,4-trimethylhexamethylene diisocyanate and similar isocyanates; 3,3'diisocyanatodipropyl ether; 3-isocyanatomethyl-3,5,5'-trimethylcyclohexyl isocyanate; cyclopentalene-1,3-diisocyanate; cyclohexylene-1,4-diisocyanate; methyl 2,6-diisocyanatocaprolate; bis-(2-isocyanatoethyl)-fumarate; 4-methyl-1,3-diisocyanatocyclohexane; trans-vinylene diisocyanate and similar unsaturated polyisocyanates; 4,4'-methylene-bis-(cyclohexylisocyanate) and related polyisocyanates; methane diisocyanates; bis-(2-isocyanatoethyl) carbonate and similar carbonate polyisocyanates; N,N'N''-tris-(6-isocyanatohexamethylene) biuret and related polyisocyanates as well as other known polyisocyanates derived from aliphatic polyamines; toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; tris(4-isocyanatophenyl) methane; naphthalene diisocyanates; 4,4'-biphenyl diisocyanate; phenylene diisocyanates; 3,3'-dimethyl-4,4'-biphenyl diisocyanate; p-isocyanatobenzoyl isocyanate and tetrachloro-1,3-phenylene diisocyanate and mixtures thereof. Preferred diisocyanates include toluene diisocyanate and diphenylmethane-4,4'-diisocyanate.

The urethane polyester prepolymer is reacted with low molecular weight chain extending diols as is known in the art to produce the final linear polyester polyurethane of the invention. Typical chain extending diols include 1,4-butane diol, ethylene glycol, diethylene glycol, 1,3-propane diol and 1,6-hexane diol.

Generally, the polyurethane employed in the practice of this invention has a molecular weight of at least 50,000, but preferably has a molecular weight greater than 100,000. At the present time, the preferred linear polyester polyurethanes are prepared by reacting a linear polyester with toluene diisocyanate and chain extending the prepolymer thus formed with 1,4-butane diol. The urethane preferably has a hydroxyl content of between about 0.08 and 0.12 percent and a solution viscosity (15% by weight in methyl ethyl ketone) of between about 400 and 800 centiposes. The linear polyester polyurethane is typically utilized in an amount ranging from about 10 to 99, preferably from about 60 to 80, percent by weight of the essential ingredients of the first component of the present invention. Essential ingredients of the first component herein refers to the linear polyester polyurethane, the halogenated polyolefin, the epoxy/silane adduct and the Diels-Alder adduct.

The halogenated polyolefin of the first component can essentially be any natural or synthetic halogenated polyolefin elastomer. The halogens employed in the halogenated polyolefinic elastomers are typically chlorine or bromine, although fluorine can also be used. Mixtures of halogens can also be employed in which case the halogen-containing polyolefinic elastomer will have more than one type of halogen substituted thereon. The amount of halogen does not appear critical and can range from as low as about 3 weight percent to more than 70 weight percent, depending on the nature of the base elastomer or polymer. Generally, the halogenated polyolefin has an inherent viscosity above 100 centipoise at 20% concentration in toluene and a halogen content of 58 to 65% by weight. Halogenated polyolefins and their preparation are known well to those skilled in the art.

Representative halogenated polyolefins include chlorinated natural rubber, chlorine- and bromine-containing synthetic rubbers and halogenated polymers derived from dienes having from 4 to 8 carbon atoms. Typical halogenated polyolefins include polychloroprene, chlorinated polychloroprene, chlorinated polypropylene, chlorinated polybutadiene, chlorinated polyisoprene, halogenated polybutylene, halogenated polyhexadiene, chlorinated butadiene styrene copolymers, chlorinated ethylene propylene copolymers and ethylene/propylene/non-conjugated diene terpolymers, chlorinated polyethylene, chlorosulfonated polyethylene, halogenated copolymers of dissimilar $\alpha$-olefins of 2 to 8 carbon atoms, chlorinated poly(vinyl chloride), and the like, including mixtures of such halogen-containing elastomers. The halogenated polyolefin of the first component can also be halogenated vinyl halide polymers including halogenated homopolymers or copolymers of vinyl halide. These halogenated materials can be made by post-halogenating the vinyl-halide resin, preferably by post-chlorinating polyvinylchloride. Such materials are commercially available and include, for instance, Genchlor S and Genchlor T, manufactured by Imperial Chemical Industries, Ltd.

Thus, substantially any of the known halogen-containing derivatives of natural and synthetic elastomers can be employed as the halogenated polyolefin in the practice of this invention, including mixtures of such elastomers. At the present time, chlorinated polyisoprene is the preferred halogenated polyolefin for use in the present invention. The polyolefin is typically utilized in an amount ranging from about 0.2 to 60 percent by weight, preferably from about 15 to 30 percent by weight of the essential ingredients of the first component.

The epoxy/silane adduct of the invention comprises the reaction product of an epoxy compound and an alkoxy silane compound. The epoxy compound useful for preparing the epoxy/silane adducts of the present invention can be any compound that contains an epoxy group having the formula:

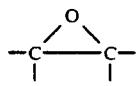

and has a viscosity of about 200 centipoise or higher at 25° C. Such materials, broadly called epoxides, include monomeric epoxy compounds and epoxides of the polymeric type and can be aliphatic, cycloaliphatic, aromatic or heterocyclic. These materials generally have, on the average, at least 1.5 polymerizable epoxy groups per molecule (preferably two or more epoxy groups per molecule). The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds but are generally mixtures containing one, two, or more epoxy groups per molecule. The "average" number of epoxy groups per molecule is determined by dividing the total number of epoxy groups in the epoxy-containing material by the total number of epoxy molecules present.

The epoxy-containing materials may vary from low molecular weight monomeric materials to high molecular weight polymers and may vary greatly in the nature of their backbone and substituent groups. For example, the backbone may be of any type and substituent groups thereon can be any group free of an active hydrogen atom which is reactive with an oxirane ring at room temperature. Illustrative of permissible substituent groups include halogens, ester groups, ethers, sulfonate groups, siloxane groups, nitro groups, phosphate groups, etc. The molecular weight of the epoxy-containing materials may vary from about 50 to 100,000 or more. Mixtures of various epoxy-containing materials can also be used in the compositions of this invention.

The epoxy compounds of the present invention may be cycloaliphatic epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate, and the like. Other suitable diepoxides of cycloaliphatic esters of dicarboxylic acids are described in, for example, U.S. Pat. No. 2,750,395, which is incorporated herein by reference.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxycyclohexylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate and the like. Other suitable 3,4-epoxycyclohexylmethyl-3,4-epoxycyclohexane carboxylates are described in, for example, U.S. Pat. No. 2,890,194, which is incorporated herein by reference.

Further epoxy-containing materials which are particularly useful in the practice of this invention include glycidyl ether monomers of the formula:

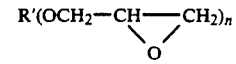

where R' is alkyl or aryl and n is an integer of 1 to 6. Examples are glycidyl ethers of polyhydric phenols obtained by reacting a polyhydric phenol [e.g., 2,2-bis(4-hydroxyphenyl)-propane, commonly known as Bisphenol A] with an excess of chlorohydrin such as epichlorohydrin. Further examples of epoxides of this type which can be used in the practice of this invention are described in U.S. Pat. No. 3,018,262, and in "Handbook of Epoxy Resins" by Lee and Neville, McGraw-Hill Book Co., New York, 1967, both the disclosures of which are incorporated herein by reference.

There are a host of commercially available epoxy-containing materials, commonly known as epoxy resins, which can be used as the epoxy compound in this invention. In particular, epoxy compounds which are readily available include octadecylene oxide, glycidylmethacrylate, diglycidyl ether of Bisphenol A (e.g., those available under the trade designations EPON 828, EPON 1004 and EPON 1010 from Shell Chemical Co., DER-331, DER-332, and DER-334, from Dow Chemical Co.), vinylcyclohexene dioxide (e.g., ERL-4206 from Union Carbide Corp.), 3,4-epoxycyclohexylmethyl-3,4-epoxycyclohexane carboxylate (e.g., ERL-4221 from Union Carbide Corp.), 3,4-epoxy-6-methylcyclohexylmethyl-3,4-epoxy-6-methylcyclohexene carboxylate (e.g., ERL-4201 from Union Carbide Corp.), bis(3,4-epoxy-6-methylcyclohexylmethyl) adipate (e.g. ERL-4289 from Union Carbide Corp.), bis(2,3-epoxycyclopentyl) ether (e.g., ERL-0400 from Union Carbide Corp.), aliphatic epoxy modified with polypropylene glycol (e.g., ERL-4050 and ERL-4052 from Union Carbide Corp.), dipentene dioxide (e.g., ERL-4269 from Union Carbide Corp.), epoxidized polybutadiene (e.g., OXIRON 2001 from FMC Corp.), silicone resin containing epoxy functionality, flame retardant epoxy resins (e.g., DER-580, a brominated bisphenol-type epoxy resin available from Dow Chemical Co.), 1,4-butanediol diglycidyl ether of phenolformaldehyde novolak (e.g., DEN-431 and DEN-438 from Dow Chemical Co.), and resorcinol diglycidyl ether (e.g., KOPOXITE from Koppers Company, Inc.).

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylateglycidylacrylate and a 62.5:24:13.5 methylmethacrylate-ethyl acrylateglycidylmethacrylate.

The alkoxy silane compounds useful for preparing the epoxy/silane adducts of the present invention correspond to the general formula:

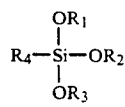

wherein $R_1$, $R_2$, and $R_3$ are the same or different monovalent aliphatic hydrocarbon residues of sufficient molecular weight that the silane is stable during preparation of the adhesive composition and yet do not prejudice hydrolysis of the silane under conditions of use of the adhesive composition, and $R_4$ is a straight chain, branched, cyclic or aromatic hydrocarbon radical, being substituted with a group capable of a chemical reaction by condensation (for example, with isocyanate groups), such as an epoxy, mercapto, amino, or hydroxyl group, and having from about 1 to 10 carbon atoms. Preferably $R_1$, $R_2$, and $R_3$ each have 1 to 5 carbon atoms and more preferably each is a methyl or ethyl group. Preferably, $R_4$ is a straight chain hydrocarbon radical substituted with a group capable of a chemical reaction by condensation (for example, with isocyanate groups), such as an epoxy, mercapto, amino, or hydroxyl group. The alkoxy silane compound may also be a combination of two or more alkoxy silane compounds as long as at least one of the alkoxy silane compounds is as defined above. The other alkoxy silane compounds in such a combination can correspond to the structure defined above with the proviso that $R_4$ can also be an unsubstituted straight chain, branched, cyclic or aromatic hydrocarbon radical and is preferably an unsubstituted aromatic hydrocarbon radical such as phenyl. Examples of suitable alkoxy silane compounds include gamma-glycidoxypropyltrimethoxy silane, gamma-aminopropyltriethoxy silane, N-beta (aminoethyl) gamma-aminopropyl-trimethoxy silane, phenyltriethoxy silane, and combinations thereof, with a combination of gamma-aminopropyltriethoxy silane and phenyltriethoxy silane being presently preferred.

The epoxy/silane adducts of the invention are typically prepared by combining the epoxy compound and the silane compound in an epoxy:silane ratio ranging from about 1:1 to 1:10, preferably from about 1:3 to 1:7, in an appropriate solvent and heating the resulting mixture to a temperature ranging from about 85° C. to 99° C., preferably from about 90° C. to 95° C., for a period of time ranging from about 2 to 12 hours, preferably from about 4 to 7 hours. The solvent can essentially be any solvent capable of dissolving the epoxy compound, the alkoxy silane compound and the resulting epoxy/silane adduct. Examples of typical solvents include toluene and xylene, with toluene being preferred.

A particularly preferred epoxy/silane adduct is prepared by reacting a Bisphenol A-type epoxy resin, gamma-aminopropyltriethoxy silane and phenyltriethoxy silane in an approximate 1:1:4 weight ratio in the presence of toluene at approximately 90° C. to 95° C. for approximately 4 to 7 hours.

The epoxy/silane adduct of the present invention is typically utilized in an amount ranging from about 0.1 to 10 percent, preferably from about 0.5 to 5 percent, by weight of the essential ingredients of the first component.

The Diels-Alder adduct of the present invention is a Diels-Alder adduct of a halogenated cyclic conjugated diene and a block copolymer of styrene and butadiene wherein the Diels-Alder adduct has a halogen content of between about 30 and 45, preferably between about 34 and 40, percent by weight.

The halogenated cyclic conjugated dienes which can be utilized to prepare the Diels-Alder adducts of the present invention can be represented by the formula:

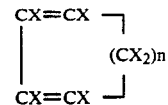

wherein X can be chlorine, bromine, or fluorine, and is preferably chlorine. The integer n can be 1, 2, or 3, and is preferably 1. The halogenated cyclic conjugated dienes are readily prepared by well-known methods and at at least one, hexachlorocyclopentadiene, is a well-known article of commerce. Other representative dienes include hexafluorocyclopentadiene, hexabromocyclopentadiene, 5,5-difluorotetrachlorocyclopentadiene and 5,5-dibromotetrachlorocyclopentadiene. Hexachlorocyclopentadiene is presently preferred for use in the present invention.

The halogenated cyclic conjugated dienes of the present invention are utilized in amounts sufficient to result in a Diels-Alder adduct containing from about 40 to 60, preferably from about 44 to 55, percent by weight of halogenated cyclic conjugated diene. This will result in a Diels-Alder adduct having a halogen content in the range from about 30 to 45, preferably from about 34 to 40, percent by weight. In order to prepare a polymeric material which exhibits the bonding characteristics disclosed herein, it is essential to ensure that the conjugated diene and corresponding halogen contents specified above are achieved in the final adduct.

The block copolymers of styrene (S) and butadiene (B) can be either diblock (SB) or triblock (SBS) copolymers. It is presently preferred for purposes of the present invention to utilize block copolymers which contain from about 20 to 40, preferably from about 25 to 33, percent by weight styrene. It is presently particularly preferred to utilize a triblock copolymer which contains between about 26 and 30 percent by weight styrene. The styrene-butadiene block copolymers of the present invention can be prepared by methods such as anionic coupling reactions which are well known to those skilled in the art and which are described in *The Encyclopedia of Polymer Science and Engineering*, 2nd ed., John Wiley & Sons, New York, 1985, Vol. 2, pp. 324–434, (see especially p. 326).

Other additional ingredients may be utilized in the preparation of the present Diels-Alder adducts. For example, free radical scavengers may be added in order to prevent radical induced crosslinking, as is known in the art. A free radical scavenger, if utilized, is typically employed in an amount ranging from about 0.05 to 0.5 percent by weight of the total reaction mixture utilized to prepare the adducts.

The styrene-butadiene block copolymers of the present invention are utilized in amounts sufficient to produce a final Diels-Alder adduct containing from about 60 to 40, preferably from about 56 to 45, percent by weight of block copolymer. This will result in a Diels-Alder adduct having a halogen content in the range of from about 30 to 45, preferably from about 34 to 40, percent by weight. As stated above, it is extremely important to utilize appropriate amounts of the block copolymers and conjugated dienes to create a Diels- Alder adduct having the specific halogen content described above.

The Diels-Alder adducts of the present invention are readily prepared by conventional techniques well known in the field of Diels-Alder reactions. In general, the Diels-Alder adduction between the halogenated cyclic conjugated diene and the styrene-butadiene block copolymer is effected in an organic solvent such as xylene in relative amounts such that the stoichiometric ratio between the halogenated cyclic conjugated diene and the unsaturation of the block copolymer is in the range of 0.01 to 1. Although xylene is preferred, other solvents such as ethyl benzene, orthodichlorobenzene, and 1,2,4-trichlorobenzene may be utilized. The mixture is heated at temperatures in the range from about 100° C. to 200° C. The reaction is continued for a time sufficient to substantially react the halogenated cyclic conjugated diene and the block copolymer to provide an adduct having a halogen content in the range from about 30 to 45, preferably about 34 to 40, percent by weight, based on the total weight of the adduct. The halogen content of the adduct can be determined by known analytical procedures, such as Schoniger combustion.

Diels-Alder adducts of a halogenated cyclic conjugated diene and a block copolymer of styrene and butadiene and their preparation are also fully described in U.S. Pat. No. 5,175,215.

The Diels-Alder adduct is typically utilized in an amount ranging from about 2 to 20, preferably from about 3 to 10, percent by weight of the essential ingredients of the first component of the present invention.

A supplemental film-forming component may also be utilized in the first component of the present invention. Examples of supplemental film-forming components include cellulose acetate butyrate and polyvinyl butyral, with cellulose acetate butyrate being preferred.

The second component of the present invention is a cross-linking compound which cross-links or cures the first component of the invention. The cross-linking compound can essentially be any material which will effectively cure or cross-link the first component of the invention. The cross-linking compound is preferably a diisocyanate compound such as 2,4-toluene diisocyanate, diphenylmethane-4,4'-diisocyanate, p-phenylene diisocyanate, m-phenylene diisocyanate, 1,4-cyclohexyl diisocyanate, tetramethylxylyl diisocyanate and dimethyldiphenyl diisocyanate, with diphenylmethane-4,4'-diisocyanate being the preferred diisocyanate compound. The cross-linker is typically utilized in an amount from about 4 to 32, preferably from about 8 to 28 parts by weight per 100 parts by weight of the essential ingredients of the first component.

A solvent is required to dissolve the respective components. Solvents useful for dissolving the first component include polar or aromatic solvents such as ethanol, butanol, 2-butoxyethanol, methyl ethyl ketone, methyl isobutyl ketone, xylene, toluene, and mixtures thereof with methyl ethyl ketone and xylene being preferred. The solvent for the first component is utilized in an amount sufficient to provide a first component having a total solids content (TSC) of from about 7 to 50 percent, preferably from about 10 to 30 percent. A solvent, although not necessary, may be utilized to dissolve the second component of the invention. Typical solvents useful for dissolving the second component include halogenated solvents such as trichloroethylene, 1,1,1-trichloroethane and perchloroethylene with trichloroethylene being preferred. The solvent for the second component, if employed, is typically utilized in an amount sufficient to provide a second component having a total solids content of from about 1 to 99 percent, preferably from about 30 to 60 percent.

The adhesive composition of the present invention can optionally contain other well-known additives including plasticizers, fillers, pigments, reinforcing agents and the like, in amounts employed by those skilled in the art to obtain desired color and consistency.

The two components of the present invention are preferably stored separately in order to avoid any premature cross-linking or curing of the formulation. The adhesive of the invention is typically applied to a desired substrate by first mixing the first component and the second component together in the amounts described previously. After the initial mixing, the resulting adhesive composition must be applied within at least about 30 days, but preferably within about 2 days, in order to avoid a premature increase in viscosity. Most preferably, the adhesive composition is applied immediately after mixing the two components, in order to avoid any increase in viscosity that might create problems associated with the corresponding application technique. The adhesive may be applied to a desired substrate by techniques known in the art such as by brushing, spraying, or dipping and is preferably applied by spraying or brushing.

In general, after applying the adhesive composition and allowing it to dry for a period of between about 12 and 24 hours, the two surfaces to be bonded should be brought together under at least 1 psi/sq. in. of pressure in order to create a permanent bond. No additional heating is required to effect the bonding.

When bonding vinyl polymers to various glass substrates, the vinyl polymer is typically applied to the surface of the substrate from an injection molding device according to techniques well known in the art. A vinyl polymer applied from such a molding device typically has an initial temperature of from about 320° F. to about 350° F. and the coated substrate and vinyl polymer are brought together under a pressure of from about 500 to about 4000 psi, preferably from about 2000 to about 3000 psi. No additional heating of the coated substrate is required for the adhesive of the invention to sufficiently bond the vinyl polymer to the substrate. After the vinyl polymer and substrate are brought together, the elastomer-substrate assembly is allowed to cool for a period of from about 12 hours to about 24 hours in order to ensure sufficient cross-linking of the adhesive composition. The vinyl polymer and the substrate may also be bonded according to other methods such as assembly bonding or extrusion.

Although the adhesive composition of the present invention has shown exceptional bonding ability with vinyl polymers such as polyvinyl chloride, the adhesive may be utilized to bond any type of substrate to any type of material such as polyether esters, polyether amides, and thermoplastic polyurethanes. The substrates to which the vinyl polymers or other materials may be bonded include substrates such as metal, plastic, thermoplastic elastomers, leather, yarns, cords, and fabric. Various metals which may be bonded according to the present invention include any of the common structural metals such as iron, steel (including stainless steel), lead. aluminum, copper, brass, bronze, Monel metal, nickel, zinc, and the like. The adhesive composition of the invention is preferably utilized to bond a vinyl halide polymer to a glass substrate. The composition of the invention may also be utilized as a coating or as a primer for other adhesive compositions for any surface or substrate.

The following examples are presented in order to further illustrate the invention but are not intended to limit in any manner the scope of the invention.

EXAMPLE 1

Preparation of Epoxy/Silane Adduct

An epoxy/silane adduct is prepared by reacting 2.0 g of a Bisphenol A-type epoxy resin (ARALDITE GY-9549-Ciba-Geigy Corporation), 2.3 g of gamma-aminopropyltriethoxy silane, and 7.6 g of phenyltriethoxy silane in 20.0 g of toluene at 90°-95° C. for 4 hours. To the resulting adduct is added 2.10 g of cellulose acetate butyrate as a film-forming component. The mixture is then heated for another 3 hours at 90°-95° C. The resulting mixture of epoxy/silane adduct and film-forming component is then diluted with 57.7 g of toluene, 3.0 g of anhydrous ethanol, 2.8 g of N-butanol and 2.5 g of 2-butoxyethanol.

Preparation of Diels-Alder Adduct

A hexachlorocyclopentadiene/styrene-butadiene triblock copolymer adduct is prepared by charging a four-necked 3L reactor equipped with stirring, $N_2$, reflux condenser, thermometer, and immersed in a heated oil bath, with the following ingredients:

| % Charged | Grams Charged | Ingredients |
|---|---|---|
| 22.1% | 568.8 gms | Triblock SBS copolymer containing 28% styrene by weight[a] |
| 52.5% | 1,350.0 gms | Hexachlorocyclopentadiene |
| 0.2% | 5.6 gms | Free-radical scavenger[b] |
| 25.2% | 649.6 gms | Xylene |
| 100.0% | 2,574.0 gms | |

[a]KRATON D1102 (Shell Chemical Company)
[b]IRGANOX 1093 (Ceiba-Geigy Corporation)

The reactor is heated to reflux at approximately 145° C. for 12 hours to produce a Diels-Alder adduct having a chlorine content of approximately 34 percent. The adduct is precipitated in methanol, filtered, and redissolved in xylene three times to remove unreacted hexachlorocyclopentadiene. The adduct is then precipitated in methanol, filtered, and vacuum dried for 8 hours at 50° C. The Diels-Alder adduct is then redissolved in a 2:1 wt. blend of methyl isobutyl ketone and xylene to a solids content of 25%.

To 703 mls of methyl ethyl ketone is added 100 grams of a linear polyester polyurethane (DESMOCOLL 500 supplied by Mobay Corporation), and the mixture is stirred until the linear polyester polyurethane is totally dissolved. To 138 mls of xylene is added 30 grams of chlorinated polyisoprene, and the mixture is stirred until the chlorinated polyisoprene is totally dissolved.

The polyurethane, the polyisoprene, the mixture of epoxy/silane adduct and film-forming component, and the Diels-Alder adduct as prepared above are blended together in order to form the first component of the adhesive. To 100 grams of the first component is then added 6.0 grams of diphenylmethane-4,4'-diisocyanate dissolved in trichloroethylene at a solids content of 50% by weight. The mixture is shaken on a paint shaker until a uniform mixture is achieved. The resulting formulation is applied to cleaned glass coupons by pouring the formulation over the coupons. The coated coupons are then dried in a fume hood to remove all of the solvents.

The coupons are then placed in an 8-cavity injection mold of an Injectamatic injection molding press available from Hydratecs, Inc. The molding press is operated with a nozzle temperature of 150° F., a screw barrel temperature of 400° F., a ram barrel temperature of 400° F., a top platen temperature of 150° F., and a clamp pressure of 3000 psi, and is operated on a cycle time of approximately 30 seconds. A polyvinyl chloride compound provided by Vista Chemical Company is injection molded into the cavities. After bonding and demolding the coupons, the coupons are allowed to cool for 24 hours before testing.

Description of Tests

Primary Adhesion per ASTM D429B: Parts are tested at room temperature with a 180 degree peel angle per ASTM D429B. Test speed is 2 inches per minute. Peel strength (pounds/linear inch or pli) and percent rubber retention are recorded.

100 Hours/176° F. Water Immersion: Parts are immersed in water for 100 hours at 176° F. After immersion, the parts dry overnight at ambient conditions. Testing occurs the following day at room temperature with a peel angle of 180 degrees. Test speed is 2 inches per minute. Peel strength (pli) and percent rubber retention are recorded.

180° F. Adhesion: Parts are heated to 180° F. for 15 minutes before testing. Testing occurs at 180° F. with a peel angle of 180 degrees. Test speed is 2 inches per minute. Peel strength (pli) and percent rubber retention are recorded.

The results of the tests as performed on coupons prepared as in Example 1 are described in Table 1 below. The designation X pli YR indicates that the bond failed at X pli of force and retained Y percent of rubber on the coupon after bond failure.

TABLE 1

| Example | Prim. Adh. | 100 Hr./176 F. Water | 180 F. Adh. |
|---|---|---|---|
| 1 | 29 pli 22R | 44 pli 35R | 26 pli 77R |

Since it is relatively difficult to bond vinyl chloride polymers to glass, a 22 percent rubber retention in the primary adhesion test above shows acceptable bonding results for this type of system. The 35 and 77 percent rubber retention values are also very acceptable values for the water immersion and 180° F. tests in a vinyl chloride polymer-glass system.

The foregoing is a discussion and technical description of the preferred embodiments of the present invention. The true scope of the invention is defined by the following claims.

What is claimed is:

1. An adhesive composition comprising a linear polyester polyurethane, a halogenated polyolefin, an epoxy/silane adduct, a Diels-Alder adduct of a halogenated cyclic conjugated diene and a block copolymer of styrene and butadiene, and a cross-linking compound.

2. An adhesive composition according to claim 1 wherein the linear polyester polyurethane is prepared by reacting an isocyanate-functional urethane polyester prepolymer with a low molecular weight chain extending diol.

3. An adhesive composition according to claim 2 wherein the urethane polyester prepolymer is prepared by reacting at least one linear polyester having 2 active hydrogen atoms with a diisocyanate; wherein the linear polyester is selected from the group consisting of 1,6-hexane diol phthalate polyester diol, 1,6-hexane diol adipate diol, and 1,6-hexane diol ethylene glycol adipate diol; and wherein the diisocyanate is selected from the group consisting of toluene diisocyanate and diphenylmethane-4,4'-diisocyanate.

4. An adhesive composition according to claim 2 wherein the chain extending diol is selected from the group consisting of 1,4-butane diol, ethylene glycol, diethylene glycol, 1,3-propane diol and 1,6-hexane diol.

5. An adhesive composition according to claim 1 wherein the halogenated polyolefin is selected from the group consisting of polychloroprene, chlorinated polychloroprene, chlorinated polypropylene, chlorinated polybutadiene, chlorinated polyisoprene, halogenated polybutylene, halogenated polyhexadiene, chlorinated butadiene styrene copolymers, chlorinated ethylene propylene copolymers and ethylene/propylene/non-conjugated diene terpolymers, chlorinated polyethylene, chlorosulfonated polyethylene, halogenated copolymers of dissimilar α-olefins of 2 to 8 carbon atoms, chlorinated poly(vinyl chloride), and mixtures thereof.

6. An adhesive composition according to claim 5 wherein the halogenated polyolefin is chlorinated polyisoprene.

7. An adhesive composition according to claim 1 wherein the epoxy/silane adduct is the reaction product of an epoxy compound and an alkoxy silane compound.

8. An adhesive composition according to claim 7 wherein the epoxy compound can be monomeric or polymeric and is selected from the group consisting of aliphatic, cycloaliphatic, aromatic, and heterocyclic epoxy compounds; and further wherein the alkoxy silane compound corresponds to the general formula:

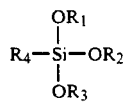

wherein $R_1$, $R_2$, and $R_3$ are the same or different monovalent aliphatic hydrocarbon residues of sufficient molecular weight that the silane is stable during preparation of the adhesive composition and yet do not prejudice hydrolysis of the silane under conditions of use of the adhesive composition, and $R_4$ is a straight chain, branched, cyclic or aromatic hydrocarbon radical, being substituted with a group capable of a chemical reaction by condensation and having from about 1 to 10 carbon atoms.

9. An adhesive composition according to claim 7 wherein the alkoxy silane compound is selected from the group consisting of gamma-glycidoxypropyltrimethoxy silane, gamma-aminopropyltriethoxy silane, N-beta (aminoethyl) gamma-aminopropyl-trimethoxy silane, phenyltriethoxy silane, and combinations thereof.

10. An adhesive composition according to claim 1 wherein the Diels-Alder adduct is a Diels-Alder adduct of a halogenated cyclic conjugated diene and a block copolymer of styrene and butadiene; and wherein the Diels-Alder adduct has a halogen content of between about 30 and 45 percent by weight.

11. An adhesive composition according to claim 10 wherein the halogenated cyclic conjugated diene is selected from the group consisting of hexafluorocyclopentadiene, hexabromocyclopentadiene, 5,5-difluorotetrachlorocyclopentadiene and 5,5-dibromotetrachlorocyclopentadiene; and wherein the block copolymer of styrene and butadiene can be either a di-block or a tri-block copolymer.

12. An adhesive composition according to claim 11 wherein the halogen content of the Diels-Alder adduct is between about 34 and 40 percent by weight.

13. An adhesive composition according to claim 1 wherein the crosslinking compound is a diisocyanate compound selected from the group consisting of 2,4-toluene diisocyanate, diphenylmethane-4,4'-diisocyanate, p-phenylene diisocyanate, m-phenylene diisocyanate, 1,4-cyclohexyl diisocyanate, tetramethylxylyl diisocyanate and dimethyldiphenyl diisocyanate.

14. An adhesive composition according to claim 13 wherein the crosslinking compound is diphenylmethane-4,4'-diisocyanate.

15. A two-component adhesive composition wherein the first component comprises a linear polyester polyurethane, a halogenated polyolefin, an epoxy/silane adduct of a halogenated cyclic conjugated diene and a block copolymer of styrene and butadiene, and a Diels-Alder adduct; and wherein the second component comprises a crosslinking compound for the linear polyester polyurethane.

16. An adhesive composition according to claim 15 wherein the linear polyester polyurethane is present in an amount ranging from about 10 to 99 percent by weight, the halogenated polyolefin is present in an amount ranging from about 0.2 to 60 percent by weight, the epoxy/silane adduct is present in an amount ranging from about 0.1 to 10 percent by weight, and the Diels-Alder adduct is present in an amount ranging from about 2 to 20 percent by weight of the first component; and wherein the crosslinking compound is present in an amount ranging from about 4 to 32 parts by weight per 100 parts by weight of the first component.

17. An adhesive composition according to claim 16 wherein the linear polyester polyurethane is present in an amount ranging from about 60 to 80 percent by weight, the halogenated polyolefin is present in an amount ranging from about 15 to 30 percent by weight, the epoxy/silane adduct is present in an amount ranging from about 0.5 to 5 percent by weight, and the Diels-Alder adduct is present in an amount ranging from about 3 to 10 percent by weight of the first component; and wherein the crosslinking compound is present in an amount ranging from about 8 to 28 parts by weight per 100 parts by weight of the first component.

* * * * *